Patented July 8, 1941

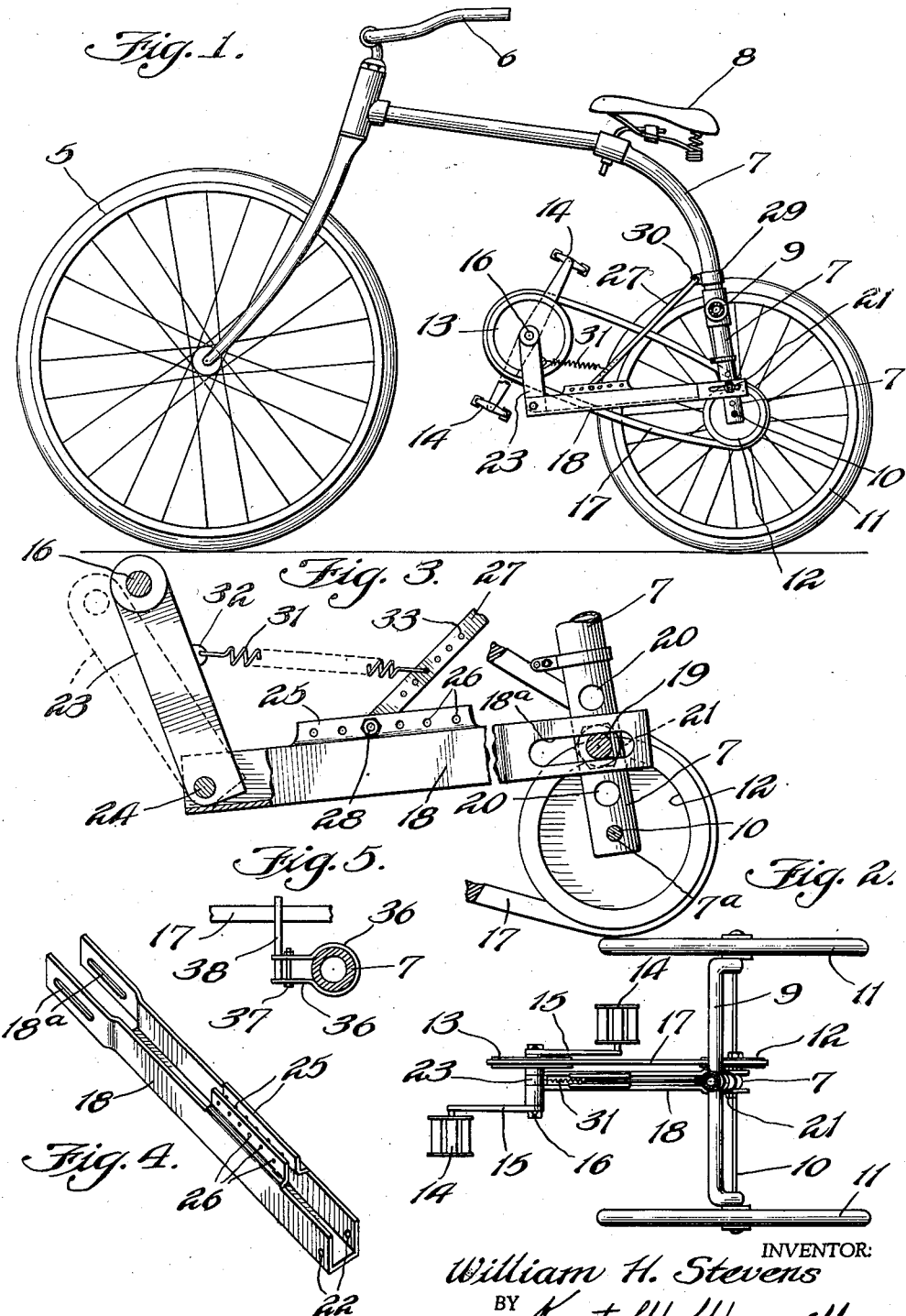

2,248,313

UNITED STATES PATENT OFFICE 2,248,313

VEHICLE DRIVE

William H. Stevens, Waukegan, Ill.

Application June 30, 1939, Serial No. 282,033

4 Claims. (Cl. 280—261)

This invention relates in general to a vehicle drive and is more particularly described as a propelling, coasting, and braking drive for children's vehicles such as velocipedes, scooters, bicycles, Irish mails, automobiles, and the like, but may have a more general use wherever applicable.

An important object of the invention is in the provision of a pedal drive in which the drive may be in either direction or by pressure upon both pedals the drive will act as a brake, and by relief of pressure the drive will constitute a coaster.

A further object of the invention is in the provision of an adjustable drive of this kind for raising or lowering the driving connection for different leg lengths.

A further object of the invention is in the provision of a belt drive in which there is less liability to injury or damage to clothing.

A further object of the invention is that when applied to a velocipede the front wheel may be turned to a sharp angle for turning in a limited space.

A still further object of the invention is in the provision of a belt drive in which the sizes of the pulleys may be easily varied for obtaining any desired speed.

Other and further objects of the invention will appear hereinafter, the accompanying drawing illustrating the preferred construction and arrangement as applied to a toy velocipede in which Fig. 1 is a side elevation of a vehicle to which this improved drive is applied;

Fig. 2 is a top view of the drive proper;

Fig. 3 is an enlarged detail view illustrating certain features of the drive;

Fig. 4 is a perspective of the drive supporting strut; and

Fig. 5 is a detail of the belt retainer.

In the ordinary chain driven vehicle, the chain must be kept reasonably tight or it will jump from the sprockets and there is always the danger that children will be injured by catching their fingers between the chain and the sprockets or that articles of clothing will be caught therebetween and soiled or damaged. It is also desirable in toy vehicles to provide means for propelling them forward and back and also to allow free movement, that is coasting, in either direction. To provide a coaster brake for toy vehicles is expensive and requires frequent service and repair to keep it in proper working order. Vehicles for children are quickly outgrown because most of them must accommodate small children and as the children grow there is no provision for increased leg length or drive.

The present invention overcomes the above objections and provides a combined drive, coaster and brake in a very simple, inexpensive and practical form, in which adjustments are readily made for varying the leg length of the drive, the brake or coaster being automatically applied, depending upon the pressure given to the pedals.

Referring now more particularly to the drawing, the invention is shown as applied to a vehicle of the velocipede type having a front wheel 5 turned by handle bars 6 for steering, a curved frame bar 7 upon which a seat 8 is mounted, a rear cross bar 9 in which a driving axle 10 is rotatable, having wheels 11 supported at the ends thereof, either or both of which may be connected to the axle for driving the vehicle. As shown, the lower end of the frame bar 7 also extends downwardly below its connection with the cross bar 9 and it may terminate short of the axle 10, or may be provided with a bearing bore 7a through which the axle is inserted. A rear driven pulley wheel 12 is mounted upon the axle close to the center post forming a driven pulley for propelling the vehicle.

The vehicle drive comprises a driving pulley 13 with pedals 14 connected thereto by crank arms 15 and a cross shaft 16 and a belt 17 which extends around the pulleys 12 and 13. The belt and pulleys are preferably of the V-type, having great strength for small cross section, and the belts having considerable resilience of themselves which tend to expand the belts and to draw the pulleys together unless tensioned.

In order to mount the driving pulley on the frame bar 7 a supporting strut 18 is provided preferably of channel shape, the sides only projecting at one end, each having a slot 18a through which a supporting pivot 19 is inserted. This pivot connection preferably comprises a sleeve as shown more clearly in Fig. 3, inserted through any one of several openings 20 at the lower end of bar 7, the ends projecting beyond the slotted sides of the channel bar and being threaded and engaged by nuts 21 at the outer sides of the slotted extremities of the strut which extend on opposite sides of the frame extension 7. This end of the strut may be adjusted in height by placing the pivot in any of the other openings 20 through the frame end 7 without affecting the position of the axle 10, and when the nuts 21 are tightened this end of the strut will be held tightly in any adjusted position.

This supporting strut may be generally of rectangular or channeled construction throughout its full length, as shown more clearly in Fig. 4, and at its other end has perforations 22 in which a driving pulley supporting arm 23 is pivoted by means of a pivot bolt 24. The pivot connection with the arm is at one edge thereof so that when mounted upon the bolt in the sides of the strut, the end of the arm will abut the bottom of the strut, limiting its movement in a direction toward the strut. The driving pulley 13, the pedals, and the pedal shaft connected thereto are all mounted at the outer or free end of the arm 23 so that when pressure is applied to the pedals for propelling the vehicle, the arm 23 will be rocked forwardly, tightening the belt 17 in both the driving and driven pulleys, so that the vehicle may be propelled in either direction in a well known manner.

In order to hold, brace and adjust the strut 18 more firmly in position, the sides of the strut adjacent the driving pulley end are formed with extensions 25 bent upwardly and together with a number of corresponding perforations 26 therethrough but spaced apart to receive one end of a flat brace 27 therebetween which is held in place in any of the sets of openings 26 by a fastening bolt 28. The other end of the brace is connected between the ends of a split collar 29 which extends around the extension frame 7 and is held in place between the ends thereof by a fastening bolt 30.

To assist in returning the driving pulley arm to its loose or coasting position, a coil spring 31 has one end attached to a projection or perforation 32 at the outer end of the arm, and the other end attachable in any one of a number of openings 33 in the adjacent edge of the brace 27. Thus the tension of the spring may be adjusted for returning the arm to its stop position against the end of the strut.

With this adjusting bracket construction the inclination of the strut may be varied between wide limits by adjusting the heighth of the slotted end of the strut with respect to the extension frame 7 and by varying the connection of the collar 29 of the supporting brace 27 for the strut. This serves to provide leg lengthening and shortening means for the vehicle and also to provide a rigid mounting for the swinging arm and the driving pulley which is loosened by the tension of the belt 17 and also by the spring 31 whenever there is no propelling tension upon the pedals, and at the same time preventing excessive loosening movement which would tend to disconnect the belt.

In order to prevent the belt from becoming disengaged from the pulleys, particularly when the belt is slack, as in coasting, a belt retainer is provided comprising a collar 36 extending around the bar 7 below the crosspiece and held in any adjusted position thereon by a clamping screw or bolt 37. Carried by and projecting at one side from the collar is a contact bar 38 adapted to overlie the upper flight of the belt 17 near the driven pulley 12, and positioned so that when the belt is tight, in ordinary driving relation the contact bar is not engaged, but when the belt is slack the bar prevents it from riding out of engagement with the driven pulley.

In operation, pressure on the pedals will tighten the belt by rocking the arm 23 forwardly and the vehicle may be propelled in either direction, forward or back, by proper operation of the pedals. When the vehicle is traveling in either direction a release of this pressure on the pedals will also release the belt so that the vehicle will coast freely in either direction, the belt being idle within the grooves of the pulleys. If it is desired to stop the vehicle at any time a pressure on both pedals gradually tightening the belt but without attempt to propel the vehicle will result in the application of the belt as a brake upon the back or driven pulley which may be only light enough to retard the movement of the vehicle or more strongly applied to bring it to a rapid stop.

While this drive is described in connection with a velocipede, it is also applicable to tricycles, scooters and toy automobiles which are usually propelled by pedals, and is also applicable to the Irish mail type of vehicles in which a rotatable driving pulley is usually operated by one or more hand levers. A similar drive may also be used wherever driving and driven pulleys are connected by relative movement of one of them and where a variation or adjustment of the movable pulley is necessary or advisable.

What I claim is:

1. A vehicle drive for propelling, braking and coasting, comprising driving and driven pulleys connected by a belt, and pedals on the driving pulley for operating it, means for mounting the driving pulley to swing by pressure on the pedals for driving and braking, and a spring for loosening the belt for coasting when pedal pressure is relieved.

2. In a vehicle drive, a supporting frame, a driven pulley rotatable in the frame, a strut adjustably connected to the frame, an arm rotatable on the strut, a pedal driving pulley pivoted at the free end of the arm, a belt extending around the driving and driven pulleys, and spring means connecting the arm and the strut tending to loosen the belt.

3. A pedal vehicle drive comprising a frame, a driven pulley mounted in the frame, a strut adjustably connected at one end to the frame having its free end adjustable in heighth with respect to the frame, an arm pivoted at the free end of the strut and at one side of the end of the arm to abut the strut in limiting its movement in the direction of the strut, a driving pulley rotatable at the free end of the arm, a belt connecting the driving and driven pulleys tending to draw the arm in its stop position against the strut, and pedals attached to the driving pulley for moving the arm in a direction to tighten the belt on the pulleys.

4. A vehicle drive comprising a frame, a driven pulley mounted in the frame, a strut having a slotted extremity adjustably connected to the frame, a pedal operated driving pulley and a belt connecting it to the driven pulley, an arm pivoted at the free end of the strut for engaging the strut and limiting its movement in the direction thereof, the driving pulley being mounted at the free end of the arm, a brace having an adjustable connection at one end with the frame and an adjustable connection at the other end with the free end of the strut to which the arm is pivoted, and a spring connected at one end to the arm and adjustably connected at the other end to the brace for drawing the arm in a direction against the strut and in a direction to loosen the driving connection of the belt between the pulleys.

WILLIAM H. STEVENS.